Feb. 16, 1971   NORIYOSHI ANDO   3,564,532
DEVICE FOR DETECTING THE DECELERATION OF A ROTATING SHAFT
Filed Sept. 27, 1967

INVENTOR.
NORIYOSHI ANDO
BY

United States Patent Office 3,564,532
Patented Feb. 16, 1971

3,564,532
DEVICE FOR DETECTING THE DECELERATION OF A ROTATING SHAFT
Noriyoshi Ando, Kariya-shi, Japan, assignor to Nippon Denso Kabushiki Kaisha, Kariya-shi, Japan
Filed Sept. 27, 1967, Ser. No. 671,076
Claims priority, application Japan, Oct. 3, 1966, 41/65,275; Nov. 9, 1966, 41/103,363
Int. Cl. G08b 21/00
U.S. Cl. 340—262           4 Claims

ABSTRACT OF THE DISCLOSURE

The velocity of a vehicle attained during each acceleration is converted into a voltage and stored in a capacitor. Upon a decrease in the velocity or in the voltage, the capacitor discharges against that voltage to bring switching transistors into operation so that the deceleration of the vehicle may be indicated. The deceleration can be indicated either independently of the velocity of the vehicle or at velocities above a predetermined value.

BACKGROUND OF THE INVENTION

The present invention relates to a device for detecting the deceleration of a moving body and, more particularly, to a device for indicating the deceleration of a vehicle, such as an automobile, and using solely electrical and electronic components.

A representative known device for detecting deceleration of a moving body, such as a rotating shaft, utilizes the inertia of a fly-wheel. In the case of detecting a small decrease in angular velocity, for example a decrease of 2 rad./sec.$^2$, this known device has the disadvantage that it is mechanically weak, and thus cannot be used for automobiles, in which use a vibration resisting characteristic is required.

There has also been proposed a device wherein the angular velocity of a moving body is converted to an electrical quantity, and this electrical quantity is differentiated. When deceleration occurs, a transistor is made conductive to detect the deceleration. In this device, however, it is impossible to avoid a time delay in the output signal voltage, due to the time delay in the output voltage of the differentiation circuit in view of the constitution of such circuit. Additionally, in order to make the time delay in the output voltage in the differentiation circuit as small as possible, an amplifier or the like is required as an additional element, and thus the circuitry is greatly complicated.

SUMMARY OF THE INVENTION

This invention relates to deceleration detectors and indicators and, more particularly, to a novel, improved and simplified deceleration detector and indicator applicable to automotive vehicles.

In accordance with the invention, means are provided to derive a direct current voltage proportional to the running speed of a body, such as an automotive vehicle. This direct current voltage, which increases in value during acceleration and decreases in value during deceleration, is applied across two capacitors, one capacitor constituting a storage capacitor, so that the two capacitors are charged to a voltage corresponding to the terminal velocity at the end of an acceleration of the vehicle.

A switching transistor is provided and has associated therewith a constant voltage circuit including a Zener diode, and this switching transistor is conductive during charging of the capacitors and remains conductive, after the capacitors are charged to the terminal voltage, by virtue of the constant voltage circuit connected thereto. The switching transistor is connected to a second transistor and maintains the second transistor non-conductive during charging of the capacitors and when the capacitors are charged to the terminal voltage. The second transistor controls energization of a deceleration indicator such as, for example, the brake lights of an automotive vehicle.

Upon a deceleration of the vehicle, the direct current voltage developed by the generating means decreases in value, and the two capacitors begin to discharge. The discharge of the storage capacitor triggers the switching transistor nonconductive to trigger the second transistor conductive to energize the deceleration indicator. The storage capacitor continues to discharge to zero and is recharged on a subsequent acceleration of the vehicle, whereas the other capacitor discharges only to a voltage corresponding to the terminal voltage attained at the end of the deceleration. Upon recharging of the storage capacitor, due to a subsequent acceleration of the vehicle, the switching transistor is triggered conductive again to trigger the second trainsistor non-conductive.

In a variation of the arrangement, a brake pedal operated switch may be connected in parallel with the deceleration detecting device so that it may also operate the brake light of the vehicle. In a further modification, additional circuit means are provided whereby the deceleration detecting device is operative only at speeds of the vehicle above a predetermined speed.

It is the principal object of the invention to provide a device for detecting electrically or electronically the deceleration of a running body.

It is another object of the invention to indicate the deceleration of a running body independently of the velocity thereof.

It is a further object of the invention to indicate the deceleration of a running body at velocities above a predetermined value.

BRIEF DESCRIPTION OF THE DRAWINGS

Other objects and advantages of the invention will be apparent from the following description taken in connection with the accompanying drawing, in which.

DESCRIPTION OF THE PREFERRED EMBODIMENTS

Figure 1:
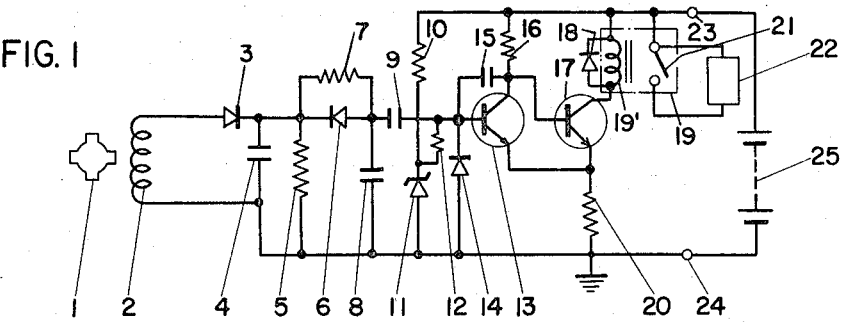
FIG. 1 is a schematic connection diagram of a device for indicating the deceleration of an automobile independently of the velocity thereof.

In the drawing similar reference characters designate corresponding parts throughout.

Referring now to FIG. 1, a permanent magnet rotor 1 of a permanent magnet generator is coupled to a moving body (not shown), such as a rotating shaft of an automobile, and rotates at a velocity in proportion to the speed of the automobile. In a generator winding 2 an alternating voltage is induced with rotation of the rotor 1. A diode 3 together with a capacitor 4 constitutes a rectifier circuit, the load resistor of which is denoted with 5. A diode 6 has its anode connected with the anode of the diode 3. Both a resistor 7, in parallel to the diode 6 and a capacitor 8, constitute a smoothing circuit. A storage capacitor 9 is connected between the cathode of the diode 6 and the base of an npn input transistor 13. A resistor 10 and a Zener diode constitute a constant-voltage circuit which is connected across a battery 25 and, from the junction point of the resistor 10 and the Zener diode 11, a base current at a constant voltage is fed to the base of the input transistor 13 through a resistor 12. In addition to the smoothing effect, the smoothing circuit, comprising the resistor 7 and the capacitor 8, serves to keep a sudden variation in voltage across the resistor 5, due to, for example, mechanical trouble of the driving member for the rotor 1, from being transferred directly to the input transistor 13. A diode 14, together with the diode 6 and the resistor 5, constitutes a discharge circuit for the storage capacitor 9. The collector of the input transistor 13 is connected with the positive pole of the battery 25 through a collector resistor 16. Between the base and the collector of the transistor 13 there is connected a capacitor 15 which serves to keep an abnormal voltage from the transistor 13, so as to stabilize the operation of the transistor 13. An npn output transistor 17 has its base connected with the collecor of the input transistor 13 while its emitter, together with the emitter of the input transistor 13, is connected with the negative pole of the battery 25 through a common emitter resistor 20 which serves as a positive feedback resistor. The collector circuit of the output transistor 17 has the exciting coil 19' of an electromagnetic relay 19 connected therein. A diode 18 in parallel to the coil 19' protects the transistor 17 against any transient voltage which may be generated across the coil 19' when the conducting transistor 17 is cut off. 21 denotes the make contact of the relay 19, 22 a deceleration indicator which is brought into operation when the contact 21 is closed, and 23, 24 terminals of the battery 25.

The operation of the above arrangement will be explained in the following: When the moving body, or rotating shaft, is accelerated, an alternating voltage, which increases in proportion to the angular velocity of the running body, therefore, of the rotor 1, is generated across the winding 2 of the generator. The alternating voltage is rectified by means of the rectifier circuit consisting of the diode 3 and the capacitor 4 so that a direct current voltage is impressed across the resistor 5. The capacitor 8 is charged with this voltage through the resistor 7, while the storage capacitor 9 is charged therewith through the resistor 7, the base-emitter path of the input transistor 13 and the emitter resistor 20. Thus the input transistor 13, supplied with both the charging current for the capacitor 9 and the current from the junction point between the resistor 10 and the Zener diode 11, is rendered conductive. Accordingly, the output transistor 17 becomes non-conductive so that the exciting coil 19' of the relay 19 carries no current and the contact 21 is held open.

When the moving body runs at a constant velocity after the acceleration, the direct current voltage across the resistor 5 is also constant so that no charging current flows to the capacitors 8 or 9 which have been charged to that constant voltage. The input transistor 13, supplied with base current from the junction point between the resistor 10 and the Zener diode 11, remains conductive. The output transistor 17 is non-conductive and the contact 21 is held open.

When the velocity of the moving body decreases, the voltage across the resistor 5 follows rapidly that decrease in velocity, provided that the time constant of the smoothing circuit 4, 5 is properly dimensioned. The capacitor 8 is now discharged through the diode 6 and the resistor 5 while the capacitor 9 is discharged through the diode 6, the resistor 5 and the diode 14, in dependence upon the difference between the voltage stored across the capacitor 8 or 9 and that across the resistor 5. Thus the base potential of the input transistor 13 is reduced approximately to zero so that the transistor 13 becomes non-conductive. At the same time the output transistor 17 becomes conductive to energize the exciting coil 19' of the relay 19. Upon closing of the contact 21, the deceleration indicator 22 is brought into operation and indicates the deceleration of the running body.

When the velocity of the moving body, after decreasing from $v_1$ to $v_2$, remains at $v_2$, the discharging current of the capacitor 9 decreases to zero in process of time. The potential at the junction between the resistor 10 and the Zener diode 11 is then applied through the resistor 12 to the base of the transistor 13 and renders it conductive. The transistor 17 returns to the non-conductive state and the contact 21 is opened.

In case the velocity of the moving body decreases and then increases again, the deceleration indicator 22 operates only upon a decrease in velocity.

When the speed of the moving body decreases to zero, the discharge current of condenser 9 becomes zero after the lapse of a fixed time, so that transistor 13 becomes conductive due to the constant currents supplied from the circuit comprising resistors 10 and 12 and Zener diode 11. Thus, transistor 17 is blocked, and therefore normally open contact 21 is opened and speed reduction indicator 22 is deactivated.

The emitter resistor 20 common to the transistors 13 and 17 serves as a positive feed back resistor from the emitter of the output transistor 17 to that of the input transistor 13 for increasing the speed of response.

The extent of the decelerationing to be detected can be arbitrarily set by proper dimension of the capacitor 9 and the resistor 12.

Figure 2:
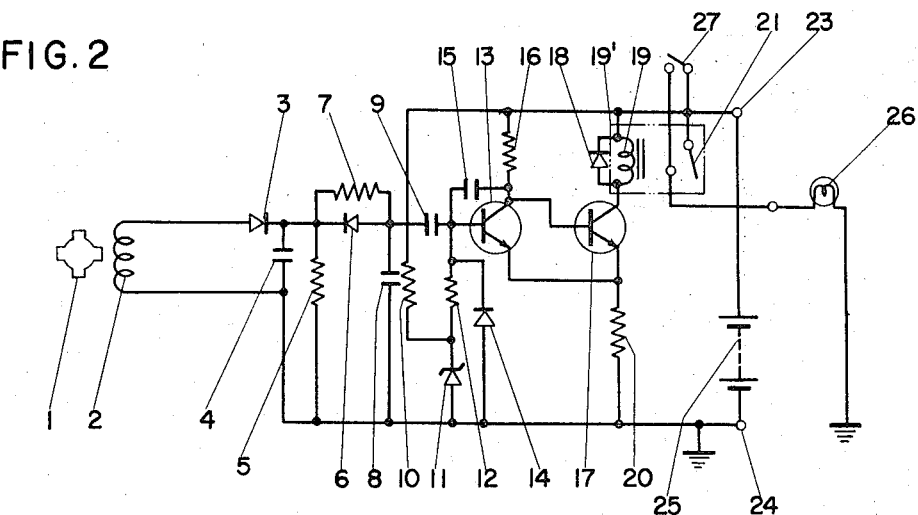
FIG. 2 is a schematic connection diagram illustrating a modification of FIG. 1.

In place of the deceleration indicator 22 in FIG. 1, a stop light 26 can be used for indicating the deceleration of an automobile as shown in FIG. 2. Thus it will be possible to switch on the stop light 26 for warning the following automobiles of the deceleration of the preceding one, even when the preceding automobile is decelerated by means of engine braking without braking by means of a brake pedal. 27 denotes a brake switch which is connected in parallel to the make contact 21 and is in operational engagement with a brake pedal. Thus the stop light 26 can also be switched on by means of the brake pedal during stopping or slowing of the automobile.

In a modification of FIG. 1, a solenoid valve may be provided in place of the deceleration indicator 22. The solenoid valve reduces the braking force at a deceleration of the automobile above the predetermined value, and keeps its locked wheels from slipping. Thus the invention can be applied to a deceleration detector for a slip protection device for automobiles.

In the above embodiments, the deceleration of a running body, for example, of an automobile is detected independently of its velocity at each time. In the dense traffic of a street, starting and stopping of an automobile is repeated alternately. Consequently it will happen that the stop light is frequently turned on not only by the brake pedal but by the engine brake, and this is apt to make the driver of the following automobile impatient. Therefore, at velocities below the predetermined value it is preferable to indicate only the operation of the brake pedal.

Figure 3:
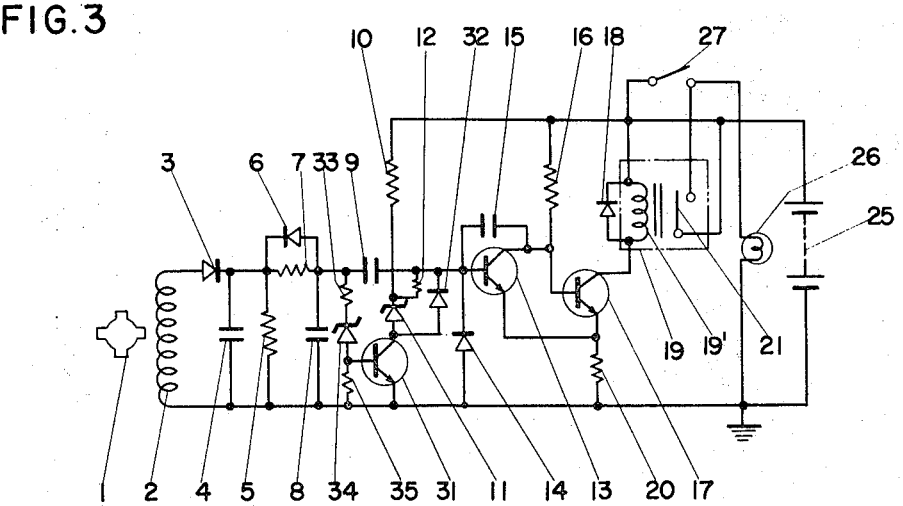
FIG. 3 is a schematic connection diagram of a device for indicating the deceleration at velocities above the predetermined value.

An embodiment for such purpose is shown in FIG. 3. When the voltage across condenser 8 is small, which occurs when the running speed of the vehicle is low, the speed reduction detecting operation is inactivated. Conversely, when the voltage across condenser 8 is high, when the running speed of the vehicle is high, the speed reduction detecting operation is activated. Between the cathode of the Zener diode 11 and the negative pole of the battery 25 there extends the emitter-collector path of an npn control transistor 31, the collector of which is connected with the base of the input transistor 13 through a diode 32. A voltage-sensing circuit consisting of a resistor 33, a Zener diode 34 and a resistor 35 connected in parallel to the capacitor 8, and the junction point between the Zener diode 34 and the resistor 35 is connected to the base of the control transistor 31.

In running of the automobile, when the rectified voltage across the resistor 5 exceeds the voltage determined by the Zener diode 34, a current flows through the resistor 33 and the Zener diode 34 to the base-emitter path of the transistor 31 and renders it conductive thus grounding its collector. The diode 32 is then cut off. The input transistor 13 is fed with base current, through resistor 12, from the constant-voltage circuit consisting of the resistor 10 and the Zener diode 11 and remains conductive, thus activating the deceleration detecting operation. The output transistor 17 becomes non-conductive so that the relay 19 is deenergized.

So far as the velocity of the automobile is high with respect to the value corresponding to the voltage determined by the Zener diode 34, its deceleration can be indicated by means of the stop light 26 as described in connection with FIG. 2.

At velocities below the value corresponding to the above determined value, the control transistor 31 is supplied with no base current and remains non-conductive, because the Zener diode 34 does not break down. The input transistor 13 is then supplied with a strong base current through the resistor 10, the Zener diode 11 and the diode 32, and remains conductive. Consequently the discharging current of the capacitor 9 cannot bring the input transistor 13 into non-conduction. The output transistor 17 remains non-conductive so that the relay 19 remains deenergized. In other words, although the automobile is decelerated by engine braking, its deceleration is not indicated on the stop light 26. It is obvious that the stop light 26 can be switched on independently of velocity by the brake switch 27 in operational engagement with the brake pedal. The threshold for detecting deceleration can be set by the Zener diode 34.

A practical test for the device in FIG. 3, using as the Zener diode 34 one having a breakdown voltage of 7 volts, has shown that with velocities of an automobile below 40 km./h. its deceleration by engine braking is not indicated by its stop light while deceleration by means of its brake pedal is indicated. When the vehicle speed increases above 40 km./h., the stop light is lit responsive to engine braking even though the brake pedal is not depressed. The apparatus of the invention is capable of detecting a vehicle deceleration of 0.5 m./sec.$^2$ (0.05 G).

What is claimed is:

1. A device for detecting the deceleration of a moving body comprising, in combination, transducer means converting the angular velocity of a rotating shaft, corresponding to the speed of the moving body, into a corresponding DC voltage; a storage capacitor having one terminal connected to an output terminal of said transducer means; a first transistor; circuit means connecting the base of said first transistor to the other terminal of said capacitor; constant current means connected to the base of said first transistor to supply a constant current to said base to maintain said first transistor normally in the conductive state; said storage capacitor, during acceleration of said moving body, with corresponding increase in said DC voltage, charging to increase the base current of said first transistor and, during constant speed running of said moving body, with said DC voltage remaining constant, retaining a constant charge; said storage capacitor, during deceleration of said moving body, with a corresponding decrease in said DC voltage, discharging to reduce the base current of said first transistor to trigger said first transistor to the non-conductive state; deceleration indicating means connected to the output circuit of said first transistor and activated responsive to triggering of said first transistor to the non-conductive state, to indicate deceleration of said moving body; and voltage detecting means connected to said output of said transducer means and to the base of said first transistor and operable, when said angular velocity is below a predetermined value, to maintain said first transistor in the conductive state during any deceleration of said moving body.

2. A device for detecting the deceleration of a moving body, as claimed in claim 1, wherein said voltage detecting means comprises a Zener diode and a resistor connected in series to the output of said transducer means and controlling said constant current means.

3. A device for detecting the deceleration of a moving body, as claimed in claim 1, in which said deceleration indicating means includes a stop lamp on the moving body; a first switch means controlling operation of said stop lamp to energize the same responsive to triggering of said first transistor to the non-conductive state; and a brake-operated switch connected in parallel with said first switch means to energize said stop lamp upon application of a brake on the moving body.

4. A device for detecting the deceleration of a moving body comprising, in combination, transducer means converting the angular velocity of a rotating shaft, corresponding to the speed of the moving body, into a corresponding DC voltage; a storage capacitor having one terminal connected to an output terminal of said transducer means; a first transistor; circuit means connecting the base of said first transistor to the other terminal of said capacitor; constant current means connected to the base of said first transistor to supply a constant current to said base to maintain said first transistor normally in the conductive state; said storage capacitor, during acceleration of said moving body, with corresponding increase in said DC voltage, charging to increase the base current of said first transistor and, during constant speed running of said moving body, with said DC voltage remaining constant, retaining a constant charge; said storage capacitor, during deceleration of said moving body, with a corresponding decrease in said DC voltage, discharging to reduce the base current of said first transistor to trigger said first transistor to the non-conductive state; deceleration indicating means connected to the output circuit of said first transistor and activated responsive to triggering of said first transistor to the non-conductive state, to indicate deceleration of said moving body; said constant current means comprising a constant voltage circuit including a Zener diode and a resistor connected in series to the base of said first transistor; a transistor connected in series with said Zener diode and said resistor; and voltage detecting means, including a second Zener diode and a second resistor connected in series to the output of said transducer means and controlling conduction of said second transistor; said voltage detecting means maintaining said device inoperative to indicate deceleration of the moving body when said angular velocity is below a predetermined value.

References Cited

UNITED STATES PATENTS

| | | | |
|---|---|---|---|
| 2,927,302 | 3/1960 | Steigerwald | 340—262X |
| 3,106,647 | 10/1963 | Danko | 340—228UX |
| 3,195,043 | 7/1965 | Burig et al. | 340—258UX |
| 3,233,946 | 2/1966 | Lockhart | 340—262X |
| 2,500,548 | 3/1950 | Keller | 324—70 |
| 3,195,043 | 7/1965 | Burig et al. | 340—258UX |

DONALD J. YUSKO, Primary Examiner

D. L. TRAFTON, Assistant Examiner

U.S. Cl. X.R.

324—70; 340—71